US006168403B1

United States Patent
Bush

(10) Patent No.: US 6,168,403 B1
(45) Date of Patent: Jan. 2, 2001

(54) ROTATING COMPRESSOR BEARING WITH DUAL TAPER

(75) Inventor: James W. Bush, Skaneateles, NY (US)

(73) Assignee: Carrier Corporation, Syracuse, NY (US)

( * ) Notice: Under 35 U.S.C. 154(b), the term of this patent shall be extended for 0 days.

(21) Appl. No.: 09/307,663

(22) Filed: May 10, 1999

(51) Int. Cl.⁷ .................. F01C 1/00; F04C 1/04; F16C 23/04
(52) U.S. Cl. ........................ 418/55.1; 384/192
(58) Field of Search ................. 418/55.1; 384/192

(56) References Cited

U.S. PATENT DOCUMENTS 5,222,881 * 6/1993 Sano et al. .................. 418/55.1
5,531,577 * 7/1996 Hayase et al. ................ 418/55.1

FOREIGN PATENT DOCUMENTS

107213 * 9/1927 (AT) ...................... 384/192

OTHER PUBLICATIONS

Translation of Austria Patent 107,213 dated Sep. 1927, copy in 384/192.*

* cited by examiner

*Primary Examiner*—John J. Vrablik
(74) *Attorney, Agent, or Firm*—Carlson, Gaskey & Olds

(57) ABSTRACT

A unique bearing system for particular use in scroll compressors includes a pair of spaced tapered portions. Upon misalignment of the shaft, the tapered portions contact the bearing and provide surface contact between the shaft and the bearing. This allows the bearing to more easily distribute the loads that are placed onto the bearing during shaft misalignment.

14 Claims, 2 Drawing Sheets

ROTATING COMPRESSOR BEARING WITH DUAL TAPER

BACKGROUND OF THE INVENTION

This invention relates to improvements in a rotating compressor shaft to support the shaft when it becomes misaligned.

Compressors typically have an electric motor or other means driving a shaft. The shaft, in turn, drives a compressor pump unit. Other rotating devices will also utilize this basic construction to drive a rotating device.

In many such applications the shaft becomes misaligned. The shaft is supported in a series of bearings in most applications. When the shaft becomes misaligned, it abuts surfaces of the various bearings at line contact points. This will result in wear on the bearing or shaft. Also, high loads are applied to those surfaces. This is undesirable.

One specific type of compressor which has this problem is a scroll compressor. A scroll compressor 20 is shown in FIG. 1 including a pump unit 22. A shaft 30 drives an orbiting scroll 26. The orbiting scroll member orbits relative to a second scroll 24. The two scrolls each have a base with a generally spiral wrap extending from the base. The orbiting scroll 26 is driven by motor 36 to orbit relative to the other scroll 24, and compression chambers are reduced in size as this orbiting movement occurs. This compresses an entrapped fluid.

An eccentric 28 is driven by shaft 30 to cause the orbiting scroll 26 to orbit. A crank case housing 32 supports the orbiting scroll 26 and the shaft 30. A shaft bearing 34 is received in the crank case 32.

A force generated by the entrapped fluid is applied to orbiting scroll 26 which transfers the force through a bearing 27 to eccentric 28. The shaft 30 will deflect in the direction of the force, both by moving through the clearance in bearing 34, and by flexing or bending elastically in response to the force. Thus, once a scroll compressor is loaded, the shaft becomes misaligned.

As shown in FIG. 2, the shaft 30 becomes misaligned within the bearing 34. When this occurs, there is line contact at points 38 and 40 at the extreme ends of the bearing. This line contact is undesirable, and may result in bearing or shaft damage.

SUMMARY OF THE INVENTION

In a disclosed embodiment of this invention, a shaft for a rotating machine has a pair of tapered surfaces extending above and below a transition surface. The tapered surfaces are positioned on the shaft such that they will move into contact with bearing surfaces when the shaft is misaligned. The tapered surfaces are thus designed to come into contact with the bearing when the shaft is misaligned. One tapered surface contacts one end of the bearing and the other tapered surface contacts the other end of the bearing. The two tapered surfaces provide contact area, rather than line contact, between the bearing and shaft.

In one preferred embodiment, the tapered surface that is closer to the driven member is longer than the tapered surface spaced from the driven member. The tapered surfaces have generally equal angles of taper such that when one abuts one side of the bearing, the other will be abutting the other side of the bearing.

In another embodiment of this invention, the transition surface actually includes a pair of curved surfaces (i.e., of varying taper) of different radius. Preferably, the transition surfaces extend sufficiently relative to the tapered surfaces such that those surfaces do provide support in the bearing before misalignment occurs.

The above disclosed invention is particularly advantageous in a scroll compressor. A scroll compressor will have its shaft somewhat misaligned once the compressor is fully loaded and thus benefits from this design.

BRIEF DESCRIPTION OF THE DRAWINGS

The invention is described in greater detail below, with reference to the following drawings.

DETAILED DESCRIPTION OF A PREFERRED EMBODIMENT

Figure 1:
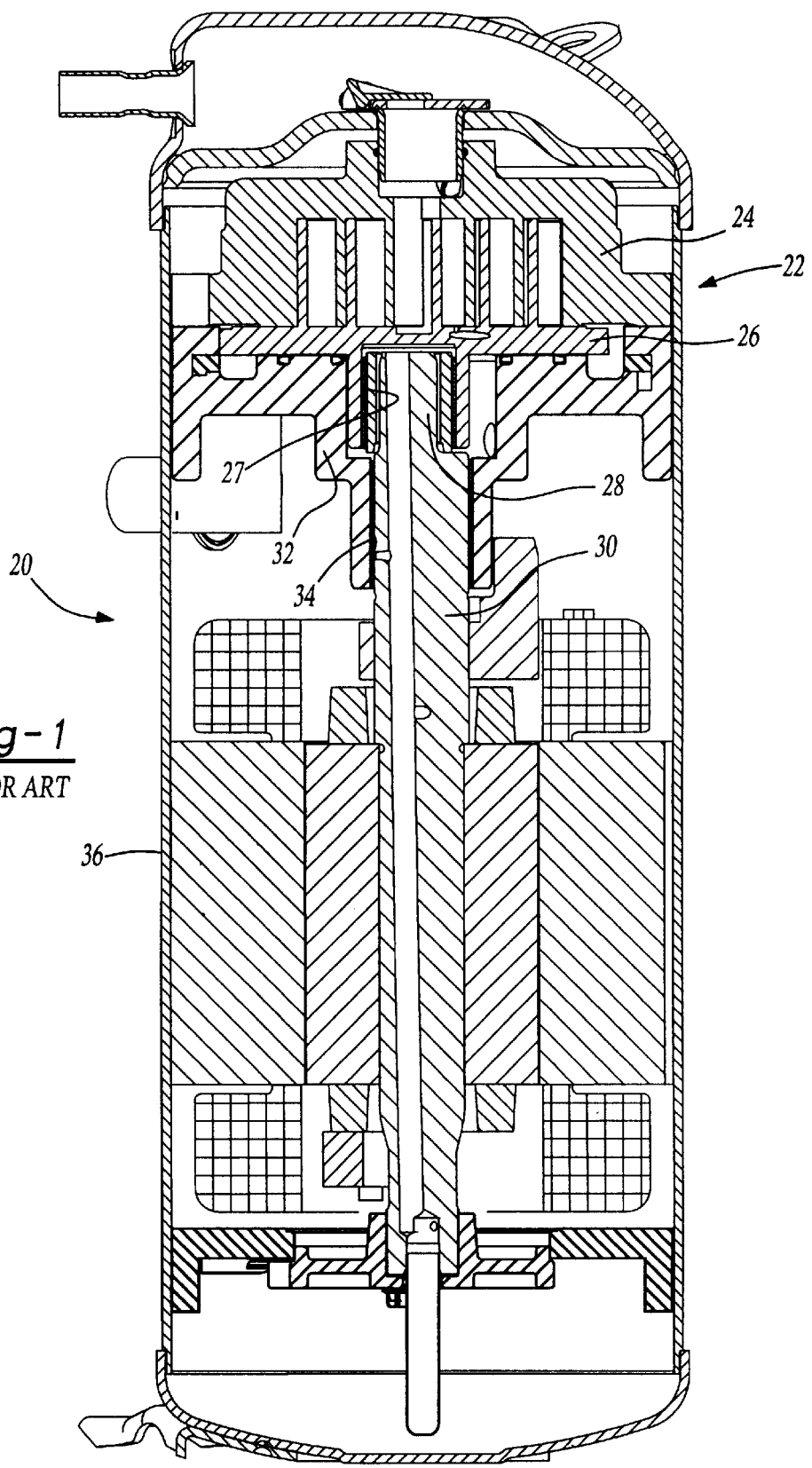
FIG. 1 is a view of a prior art compressor.
Figure 2:
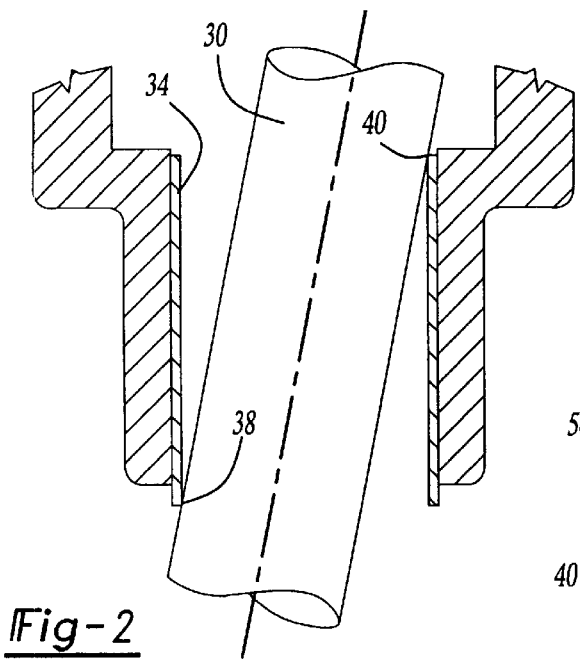
FIG. 2 shows a problem experienced by the prior art compressor.
Figure 3:
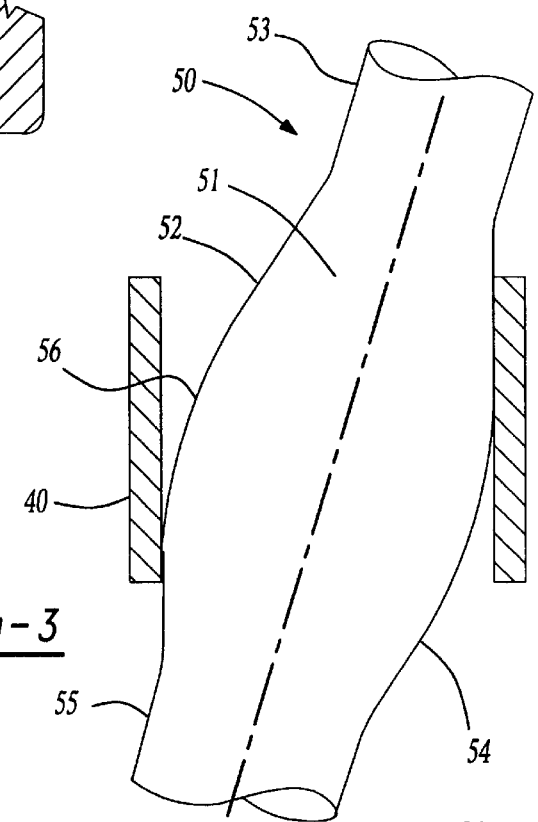
FIG. 3 shows a first embodiment shaft.

FIG. 3 shows an inventive embodiment 50 of the shaft 51. As shown, tapered surfaces 52 and 54 are separated by a transition surface 56 formed along a radius. The tapered surfaces 52 and 54 contact the bearing 40 over a surface area, rather than at line contact. The size and angle for the surfaces 52 and 54 are selected once the loaded position of the shaft 51 is determined after the compressor has been designed. Embodiment 50 replaces the shaft 30 from the prior art FIG. 1, and is preferably utilized in a scroll compressor. However, it should be understood that this shaft arrangement would have benefit in other rotating devices, and other types of compressors. Given that scroll compressors are typically expected to be misaligned at a fully loaded condition, the present invention is particularly useful in the scroll compressor environment. As can also be seen, shaft portions 53 and 55 extend from the tapered surfaces 52 and 54 and connect to the orbiting scroll and the motor, respectively.

Figure 4:
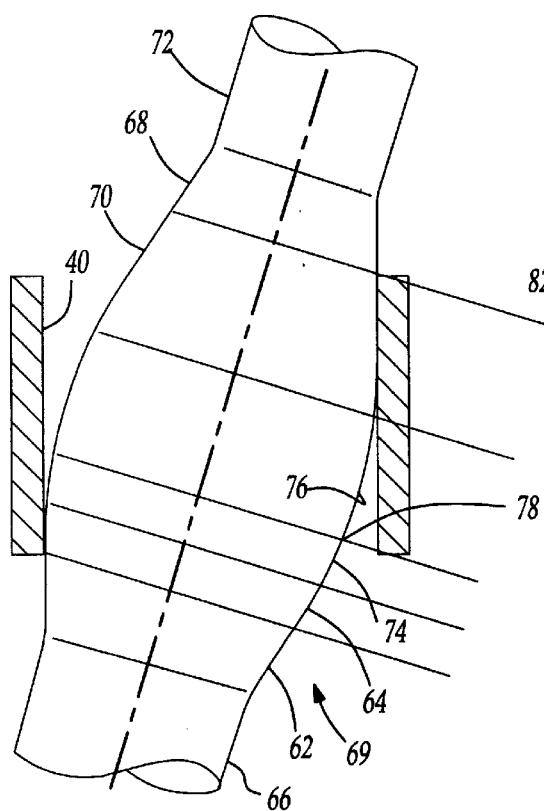
FIG. 4 shows a second embodiment shaft.

FIG. 4 shows another embodiment 69 wherein the transition surface 74 and 76 is formed of two distinct portions. The tapered portions 64 and 70 are again formed to have generally equal taper angles such that when they move into contact with the bearing 40, there will be area contact at both locations. As can be seen, the areas are preferably designed to be parallel to the bearing surface at full deflection.

The portion 70 is much longer than the portion 64. The portion 70 is closer to the scroll compressor, and typically must bear a much greater force than portion 64.

The transitions surfaces 74 and 76 are designed to be tangent to the ends of the taper associated with each tapered portion and tangent to each other at a point 78. Again, much of the shape and design of the surfaces is defined by the particular scroll compressor, and the available axial space with regard to the bearing 40. Ramped portions 68 and 62 connect tapered portions 70 and 64 to shaft portions, 72 and 66, respectively.

Figure 5:
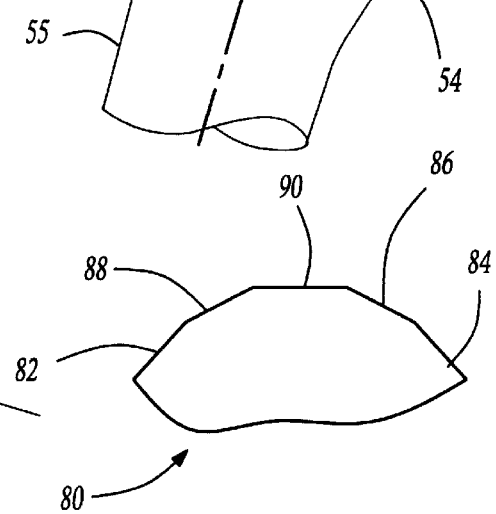
FIG. 5 shows a third embodiment shaft.

FIG. 5 shows a shaft portion 80, wherein the amount of differences between the angles of the surfaces are exaggerated to show separate portions of the transition portion. In particular, the two frusto-conical tapered portions 82 and 84 blend into tapered frusto-conical portions 86 and 88, and into a parallel portion 90. There may be tapered portions in addition to 86 and 88 as part of the transition portion.

Figure 6:
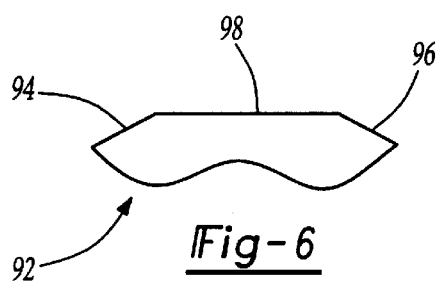
FIG. 6 shows a fourth embodiment shaft.

FIG. 6 shows a shaft embodiment 92 wherein the tapered portions 94 and 96 are connected by a transition portion 98 which is formed of a straight cylindrical portion of a constant diameter.

The FIG. 5 and FIG. 6 embodiments may be easier to machine than the earlier embodiments. Thus, they may be beneficial for that reason.

Essentially, the tapered portions in the embodiments are frusto-conical, and formed on generally equal but reversed angles. In this way, the benefits set forth above will be achieved.

A preferred embodiment of this invention has been disclosed, however, a worker of ordinary skill in this art would recognize that certain modifications would come within the scope of this invention. For that reason, the following claims should be studied to determine the true scope and content of this invention.

What is claimed is:

1. A rotating machine comprising:

a shaft being driven for rotation;

a housing including an elongated bearing supporting said shaft;

a driven element operably connected to be driven by said shaft; and a portion of said shaft received within said bearing and having tapered portions at two axially spaced locations, said tapered portions being generally on equal reversed angles such that if said shaft is misaligned within said bearing, said tapered surfaces contact said bearing at axially spaced locations over the surface area, said tapered portion which is closer to said driven element extends for a greater axially distance then the other of said tapered portions.

2. A machine as recited in claim 1, wherein a motor drives said shaft.

3. A machine as recited in claim 1, wherein said driven element is a scroll set in a scroll compressor.

4. A machine as recited in claim 1, wherein a transition portion is formed between said tapered portions.

5. A machine as recited in claim 4, wherein said tapered portions are frusto-conical and said transition portion is formed by a plurality of short tapered portions of varying angles selected to approximate a curved portion in combination.

6. A machine as recited in claim 4, wherein said tapered portions are frusto-conical and said transition portion is formed of a cylindrical portion centered on a rotational axis of said shaft and having a generally constant diameter.

7. A rotating machine comprising:

a shaft being driven for rotation;

a housing including an elongated bearing supporting said shaft;

a driven element operably connected to be driven by said shaft; and a portion of said shaft received within said bearing and having tapered portions at two axially spaced locations, said tapered portions being generally on equal reversed angles such that if said shaft is misaligned within said bearing, said tapered surfaces contact said bearing at axially spaced locations over a surface area; and a transition portion formed between said portions, said tapered portions are frusto-conical, and said transition portion is formed to be curved.

8. A scroll compressor comprising;

a shaft being driven for rotation by a motor;

a scroll pump unit including an orbiting scroll driven by said shaft, and a second scroll, said orbiting scroll orbiting relative to said second scroll;

a housing including an elongated bearing supporting said shaft; and said shaft received within said bearing and having tapered portions at two axially spaced locations, said tapered portions being frusto-conical and generally on equal reversed angles such that when said shaft is misaligned within said bearing, said tapered portions contact said bearing at axially spaced locations over a surface area, said tapered portion which is closer to said orbiting scroll extending for a greater axial distance than the other of said tapered portions.

9. A scroll compressor as recited in claim 8, wherein said bearing is mounted adjacent an eccentric which is attached to said shaft and connected to said orbiting scroll.

10. A compressor as recited in claim 8, wherein a transition portion is formed between said tapered portions.

11. A compressor as recited in claim 10, wherein said transition portion is formed to be curved.

12. A compressor as recited in claim 10, wherein said transition portion is formed by a plurality of short tapered portions of varying angles selected to approximate a curved portion.

13. A compressor as recited in claim 10, wherein said transition portion is formed of a straight cylindrical portion centered on a rotational axis of said shaft.

14. A scroll compressor comprising:

a shaft being driven for rotation by a motor;

a scroll pump unit included an orbiting scroll driven by said shaft, and a second scroll, said orbiting scroll orbiting relative to said second scroll;

a housing including an elongated bearing supporting said shaft; and said shaft received within said bearing and having tapered portions at two axially spaced locations, said tapered portions being frusto-conical and generally on equal reversed angles such that when said shaft is misaligned within said bearing, said tapered portions contact said bearing at axially spaced locations over a surface area, said bearing being mounted adjacent an eccentric which is attached to said shaft and connected to said orbiting scroll, said tapered portions including one closer to said orbiting scroll and one spaced from said orbiting scroll, said tapered portion closer to said orbiting scroll extending for a greater axial distance than the other of said tapered portions.

* * * * *